Oct. 20, 1936.   J. A. PORTEOUS   2,058,257
RETAINING MEANS FOR RUBBER LININGS
Filed April 27, 1935
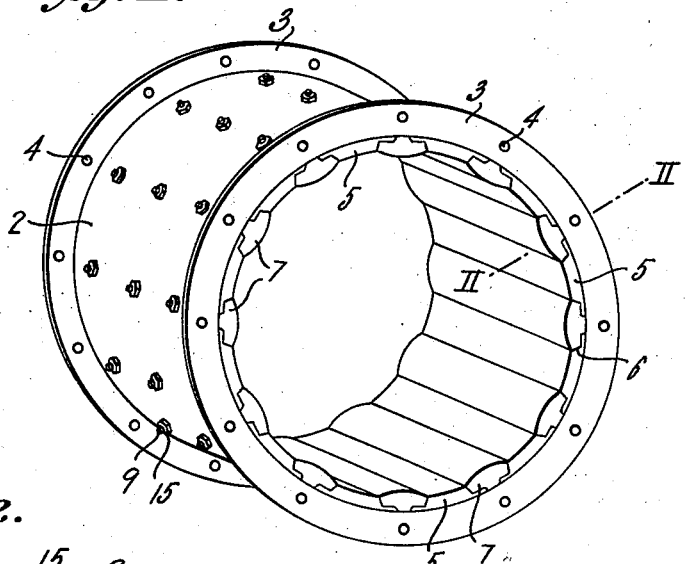
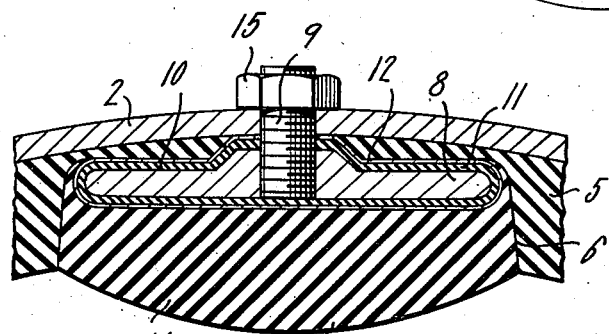
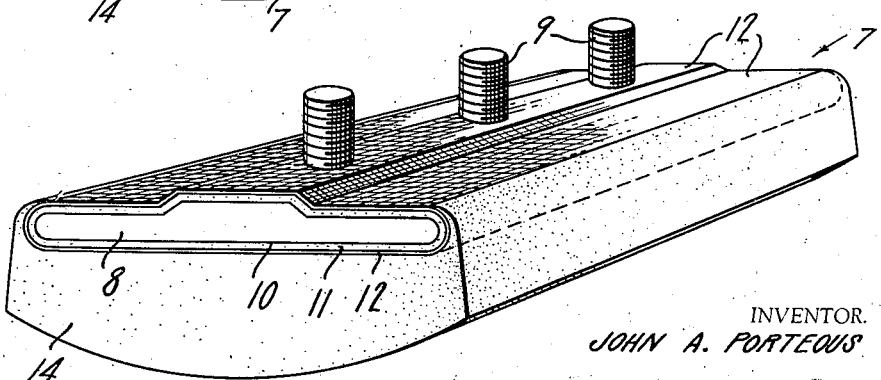
INVENTOR.
JOHN A. PORTEOUS
BY
ATTORNEY.

Patented Oct. 20, 1936

2,058,257

UNITED STATES PATENT OFFICE 2,058,257

RETAINING MEANS FOR RUBBER LININGS

John A. Porteous, Montreal, Quebec, Canada, assignor to United States Rubber Products, Inc., New York, N. Y., a corporation of Delaware Application April 27, 1935, Serial No. 18,534

1 Claim. (Cl. 83—9)

My invention relates to retaining means for rubber linings, and more particularly to means for securing rubber linings to metal shells.

A rotary mill for mixing and/or pulverizing various types of materials in common use is characterized by a shell, at least part of which is cylindrical, having a rubber lining which protects the metal of the shell against the action of chemicals destructive to metal; and also against the wearing action of the material placed therein and metal balls and the like which are sometimes added for pulverizing ores and other lumpy materials. The ends of the shell are closed by plates having rubber faces which plates may be provided with suitable ports or other openings for feeding or discharging materials. As the linings of such mills must be replaced from time to time, it is preferable that the rubber shall be detachably secured to the shells.

The detachable securing of such rubber linings to the metal shells has hereinbefore involved much difficulty. A common method for securing such linings has been to place iron bars extending longitudinally of the shell over the rubber at suitable intervals, and secure them by bolts extending through the bars, the underlying rubber and the shell. As the exposed metal bars wear faster than the rubber there is a tendency for the bars to wear out before the rubber. In order to avoid frequent replacement of the bars, there is a tendency to use very thick bars which causes them to initially extend well above the face of the rubber and to be subjected to excessive wear as well as producing an excessively uneven surface in the mill. Even then the rubber lining usually outlasts the life of several sets of bars.

By the present invention I provide for detachably retaining such rubber linings by utilizing bars entirely covered with rubber of substantially the same thickness as the thickness of the rubber lining, thereby presenting a rubber surface of uniform thickness to the material in the mill whereby the lives of the retaining bars are substantially the same as the life of the lining.

The accompanying drawing illustrates a present preferred embodiment of the invention, in which:—

Fig. 1 is a perspective view of a cylindrical portion of a mixing or pulverizing mill with the lining in place, the end pieces being removed;

Fig. 2 is a transverse sectional view of a portion of the mill taken along the section line indicated by reference numerals II—II; and Fig. 3 is a perspective view of a retaining bar.

Referring to the drawing, there is illustrated a metal shell 2 constituting the body or cylindrical portion of a mixing or pulverizing mill. However, it is to be understood that the invention is applicable to other shapes of shells. The shell 2 is provided with flanges 3 having bolt holes 4 for the attachment of the end plates, not shown. Ordinarily, the cylinder and/or the end plates are provided with means for rotating the mill, but which are not shown in the drawing as they form no material part of the present invention. The shell is provided with lining strips or sections 5 of rubber, usually soft rubber, although semi-hard rubber compositions may be used for some purposes, as is well known in the art. The strips 5 are provided with shouldered edges 6 for the reception of retaining or securing bars 7. The strips 5 and the bars 7 collectively form a continuous rubber lining around the inside of the shell.

Referring particularly to Figs. 2 and 3, each retaining bar 7 comprises a metallic core 8 of approximately the width of each of the recesses 6. The metal bar 8 is preferably thicker near its centre than at its edges to fill the spaces between the edges of the strips 5 and engage the inner surface of the shell.

In manufacturing the bars 7, the metal bars 8 are first covered with a layer of rubber-to-metal adhesive 10 for securing a layer 11 of rubber. The rubber layer 11 is in turn covered with a wrapping 12 of fabric, preferably duck. The bar so formed is placed in a mold with a batch of rubber engaging the fabric on the outer or smooth face of the bar. Upon vulcanizing the outer or surface rubber 14 is bonded directly to the duck layer. The layer 14 terminates at the edges of the bar 8 so that the fabric 12 on the other face may directly engage the bottom of a recess 6. The rubber layer 14 is made of substantially the same thickness as the strips 5.

The outer surface of the rubber layer 14 is curved so that when the completed retaining bar 7 is mounted in the shell, as shown in Fig. 2, the interior of the mill presents a continuous rubber surface of uniform depth of active cushioning rubber, although the surface is provided with irregularities or waves which are of some advantage in the operation of the mill. Each retaining bar 7 fills the recess in which it is seated, and by extending the bolts 9 through the outer shell, they may be secured by nuts 15 without exposing any metal to the interior of the mill. During the operation the rubber layers 14 on the faces of the bars, being of substantially the same thickness as the strips 5, give substantially uniform wear for both the bars and the lining so that one set of retaining bars 7 will last for substantially the life of the strip 5.

While I have shown and described a present preferred embodiment of my invention, it is to be understood that various changes may be made therein without departing from the spirit of the invention and the scope of the appended claim.

Having thus described my invention, what I claim and desire to protect by Letters Patent is:—

In combination, a retaining bar for a mill lining comprising a metal bar having a raised portion of one face for cooperation with a mill wall to provide spaces for clamping lining edges, securing means for the bar on the raised portion connected to the mill wall, a lining for the mill wall having edges secured between the bar and mill wall and having spaced inwardly extending portions, and a rubber layer secured to the bar opposite the raised portion, said rubber layer being of substantially the same thickness as said portions and having outwardly flaring edges to provide a beveled fit therewith.

JOHN A. PORTEOUS.